M. O. ANTHONY.
TYPE WRITER DUPLICATING MECHANISM.
APPLICATION FILED FEB. 20, 1914.

1,247,609.

Patented Nov. 27, 1917.
7 SHEETS—SHEET 7.

Witnesses.
J. Morrill Fuller
William E. Gagen

Inventor.
Marcus O. Anthony,
by Heard Smith & Tennant.
Atty's.

UNITED STATES PATENT OFFICE.

MARCUS O. ANTHONY, OF NEW YORK, N. Y., ASSIGNOR TO A. KIMBALL CO., OF NEW YORK, N. Y., A CORPORATION OF NEW YORK.

TYPE-WRITER DUPLICATING MECHANISM.

1,247,609.  Specification of Letters Patent.  Patented Nov. 27, 1917.

Application filed February 20, 1914. Serial No. 820,069.

*To all whom it may concern:*

Be it known that I, MARCUS O. ANTHONY, a citizen of the United States, residing at New York city, county of New York, State of New York, have invented an Improvement in Type-Writer Duplicating Mechanism, of which the following description, in connection with the accompanying drawing, is a specification, like characters on the drawing representing like parts.

This invention relates to repeating or duplicating mechanism for typewriting machines and comprises means whereby a word, a line, or a series of lines may be typewritten in the usual manner or may be set up on mechanism which may thereafter be caused to actuate the type bars in the order in which they were first struck to reproduce the subject matter originally written or set up.

Frequently in commercial work it is desirable to write certain subject matter and repeat the same an indefinite number of times and during the time such repetition is being accomplished to interrupt the duplication to typewrite other subject matter differing therefrom and when the latter has been completed to return to the repetition of the subject matter originally written. As a specific instance of the utility of such a machine mention may be made of the typewriting of pin tickets adapted to be attached to articles of merchandise offered for sale in stores. In writing pin tickets it is frequently necessary to write several hundred of one kind and but one or two of another and it is also desirable oftentimes to write a few tickets before the duplicating mechanism has completed filling a large order. It is therefore desirable that a machine be provided with means in which the subject matter adapted to be printed on a large number of tickets may be set up and the duplication proceeded with at will, and also that the machine be provided with means whereby the mechanism may be rendered temporarily inoperative to permit the writing of tickets of another character.

In the preferred form of machine embodied in this invention which is disclosed herein an ordinary typewriter is utilized, repeating mechanism being placed beneath the same in which the subject matter written on the first card is set up by means of actuators positioned upon the surface of a rotatable drum, said actuators being adapted to coöperate with electrical contacts during the subsequent revolutions of the drum to energize solenoids connected with the keys of the typewriting machine to cause the repetition of the subject matter set up in the order in which the keys were originally struck.

One of the objects of this invention therefore is to produce a duplicating mechanism for a typewriting machine which will repeat the subject matter originally written in the order in which the characters were struck.

Another object of the invention is to provide means for automatically producing spaces between the lines as the subject matter originally set up is being duplicated.

Another object of the invention is to provide an automatic means for returning the carriage to its starting position at the end of every line duplicated.

Another object of the invention is to provide means whereby the repeating mechanism may be rendered inactive while other subject matter is being written without disarranging the repeating mechanism so that the duplicating operation may be resumed without resetting the subject matter.

Another object of the invention is to provide means for rotating the repeating mechanism intermittently to receive and position the actuators representing the subject matter originally written and to provide means whereby the drum will be automatically stopped upon the completion of a single rotation.

Another object of the invention is to provide an electrically actuated key operating mechanism adapted initially to depress the key with a comparatively slow movement and to end the stroke with an accelerated movement.

Another object of the invention is to provide a support for the card or pin ticket which is to receive the subject matter to be written with electrically operated means for raising the same for differently spaced lines of typewriting.

Another object of the invention is to provide means for actuating the card holder which may be electrically operated from the line spacing key of the typewriter and which means may also be actuated by mechanism controlled from the repeating drum.

The nature of the invention and other objects thereof will more fully appear from the following description and accompanying drawings and will be particularly pointed out in the appended claims.

In the preferred form of the invention illustrated in the drawings herein a typewriter of a usual construction, as for example the Underwood, is supported from a base 1 by suitable posts 2 having extensions or tenons inserted in apertures in the bottom of the upright members of the end frames 3 and 4 of the typewriting machine while in the space between the base of the typewriting machine and the base 1 there is arranged a traveling repeating mechanism preferably a drum 5 provided with adjustable actuators adapted to be set up by the typewriting mechanism as subject matter is being originally written, said actuators being thereafter caused to open and close electrical circuits connected with and adapted to energize solenoids the cores of which are suitably secured to the key levers of the typewriting machine so that when the subject matter has been set up on the repeating drum during one revolution, subsequent revolutions of said drum will automatically cause the depression of the keys in the order in which they were originally struck, thus duplicating the subject matter originally written.

As illustrated in the drawing the typewriting machine comprises a usual construction in which the key levers 6 are pivoted upon a rod 7 at the rear of the machine and are provided with a downwardly offset portion 8 which has been utilized in the present construction as a means for operating the setting up mechanism as will hereinafter be described.

Each key lever 6 is connected to the usual bell-crank lever 9, one arm of which is connected to the slotted end of the type bar 10 so that upon the depression of the key the type bar will be actuated in the usual manner. The usual typewriter escapement for releasing the carriage step by step is present in the machine although not shown in the drawings.

Mounted upon the face 1 beneath the typewriting mechanism is a traveling repeating mechanism which is preferably in the form of a drum 5 which is rotatably mounted in supports 11 and 12 which extend upwardly from the base intermediate of the end posts 2, the support 11 being annular in form and preferably having a ball raceway and balls 13 to provide for the easy rotation of a cylindrical drum head 14.

The opposite drum head 15 is smaller in diameter, and is provided with an integral extension 16 which forms a shaft for supporting the drum and is rotatably mounted in the bearing 17 in the support 12. The drum heads are connected by a spacing sleeve 18 and carry between them an annular member 19 which is provided with a series of radial slots 20 in which are slidably mounted actuators 21, the stems 22 of which are provided with oppositely disposed recesses 23 which receive guide plate 24 secured to the ends of the partitions 25 which separate the radial slots 20.

Figure 4:
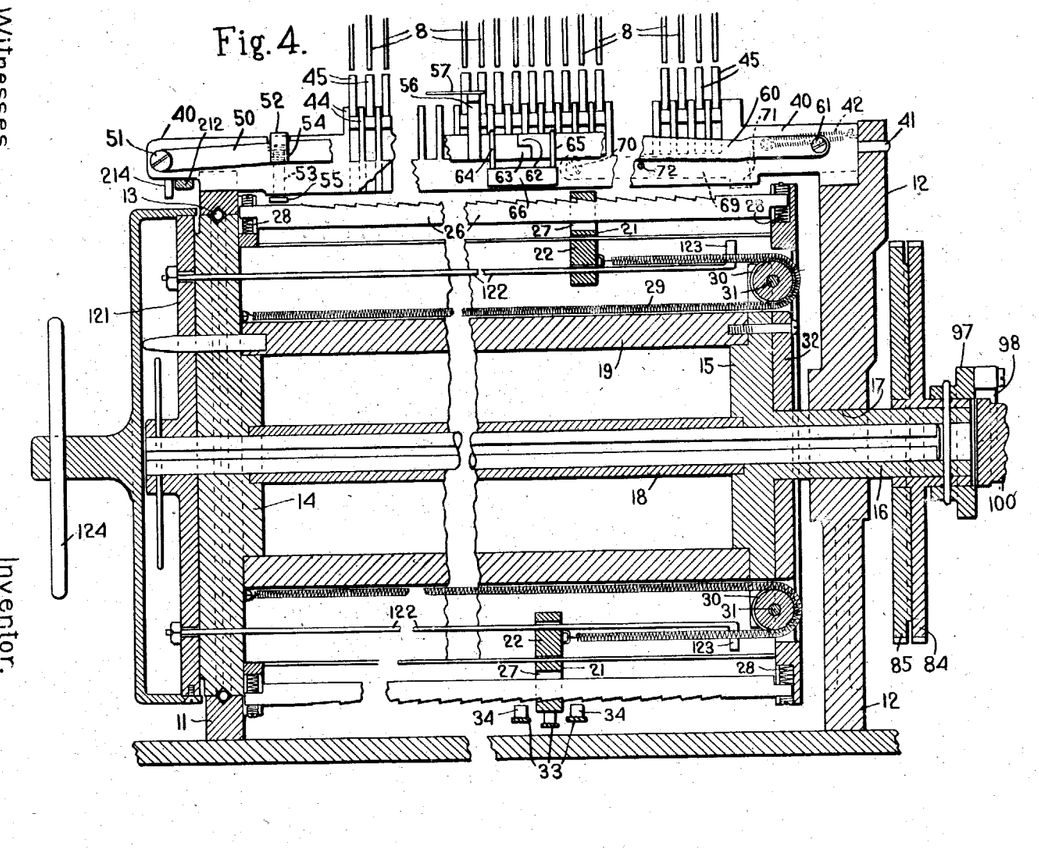
Fig. 4 is a vertical longitudinal sectional view of the repeating drum and mechanism for positioning the actuators thereon showing also diagrammatically the relative position of the type key levers of the typewriting machine.
Figures 5, 6:
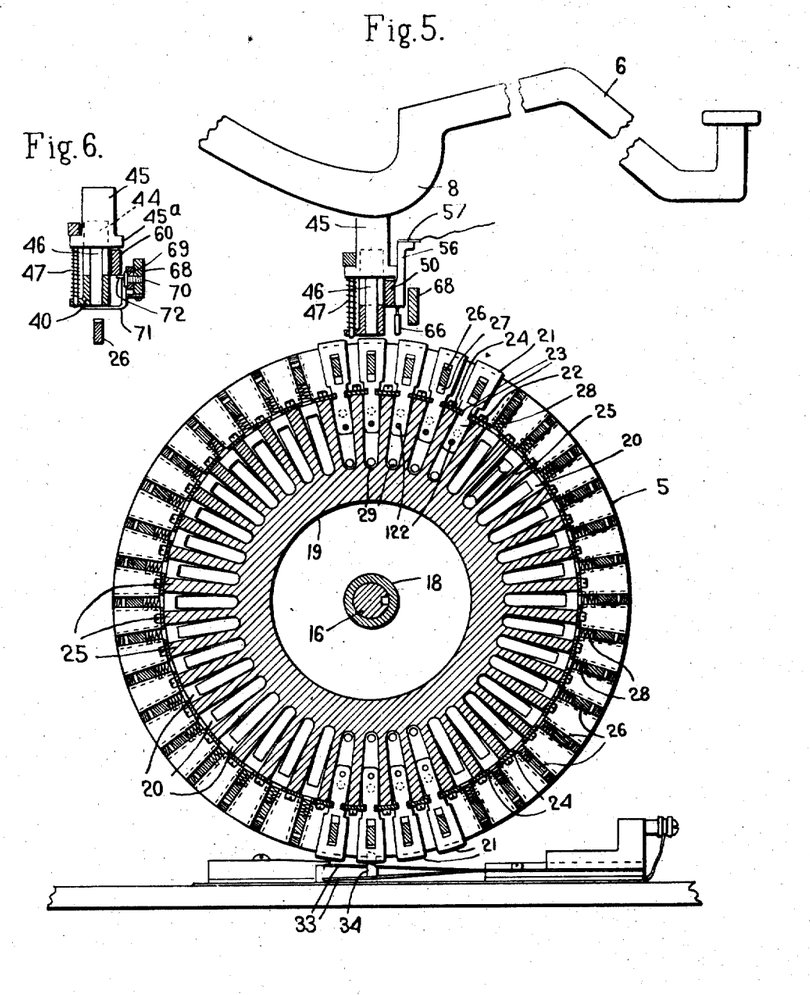
Fig. 5 is a vertical transverse sectional view of the same illustrating the relative position of the key lever, the positioning mechanism for the actuators and the drum which supports the actuators.
Fig. 6 is a detail sectional view of another portion of the positioning mechanism for the actuators than that illustrated in Fig. 5.
Figures 7, 8, 9, 10, 11:
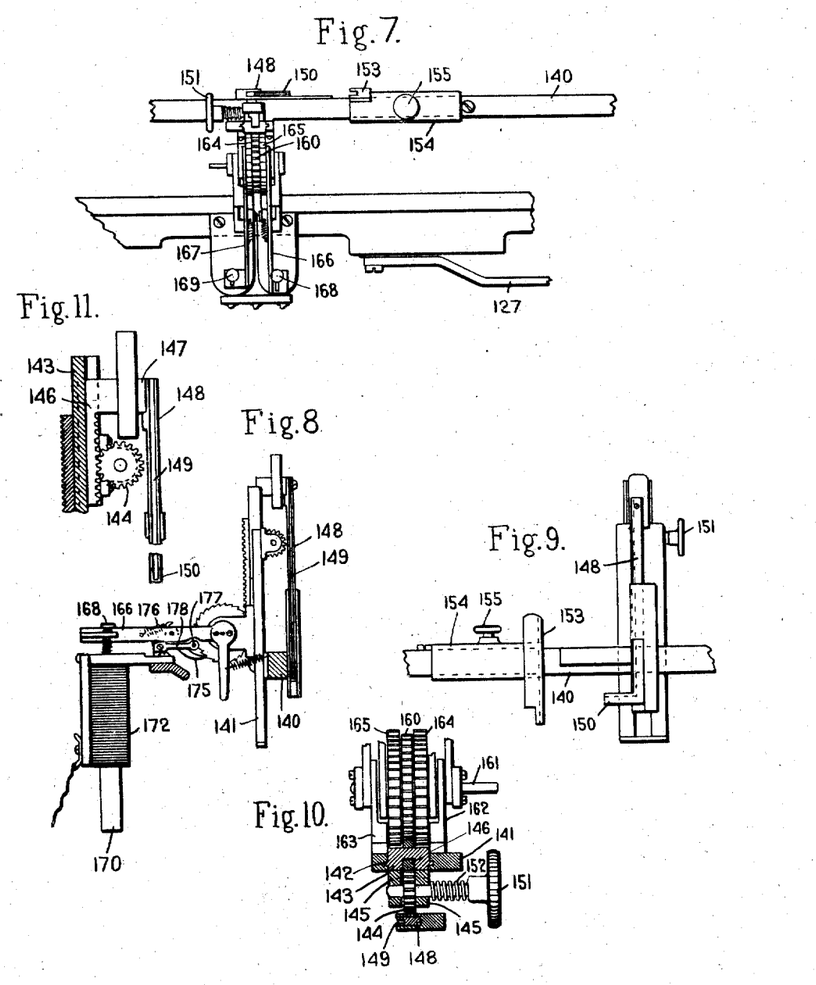
Fig. 7 is a plan view of the card holder and parts of the mechanism for operating the same.
Fig. 8 is a side elevation thereof.
Fig. 9 is a front elevation of the card holder and adjustable guide for the edge of the card.
Fig. 10, is a plan view of the pawl and ratchet mechanism and the rack for raising and lowering the card holder.
Fig. 11 is a detail sectional view of the means for adjusting the head of the card support.
Figure 14:
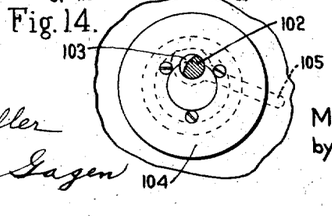
Fig. 14 is an end elevation of a portion of the driving gear and the shaft driven thereby showing in section a half round shaft adapted to interlock or to release said members.

As is illustrated in Figs. 4 and 5 each actuator is retained normally in position at the left end of the drum by a serrated rack 26 which passes through an aperture 27 in the head of the actuator 21, the rack 26 being normally held projected toward the periphery of the drum and in locking engagement with its actuator by springs 28 located beneath its ends. The stem 22 of each actuator is connected to one end of an elastic member preferably a spiral spring 29 which extends around a pulley 30 upon a ring 31 clamped in coöperating grooves in the head 15 of the drum and a supplemental head 32. It will thus be observed that the actuators are constantly under the tension of the springs 28 which tend to slide them longitudinally of the drum, and upon their release from engagement with the rack 26 they will slide freely along the surface of the drum and therefore may be positioned beneath the type bars by suitable arresting mechanism actuated from the type bars.

The actuators when thus positioned by the type bars are adapted to contact with resilient members 33 of electrical contacts located upon the base 1 of the machine and by depressing the members 33 against their coöperating members 34 to complete an electrical circuit through the solenoids 35 causing the cores 36 of such solenoids to be depressed and through suitable connection with the key levers 6, as by hooks 37 embracing said levers, will cause the actuation of the type bars to duplicate the subject member set up in the drum.

In order to produce a staccato stroke of the type bar during the repeating operation like that which is given by the normal operation of the type keys mechanism is provided which is adapted to impart a relatively slow initial movement to the type bar which is accelerated as the type approaches the platen and is immediately released upon the completion of the stroke. In the preferred form illustrated herein the lower end of the solenoid 35 is provided with an armature 38 of cylindrical form which extends upwardly within the hollow core of the coil to, or nearly to, the point reached by the lower end of the solenoid core 36 when the type key is depressed. When the solenoid is energized the armature 38 becomes in effect an electro-magnet and as the core of the solenoid is drawn down it enters the field of the armature magnet and is drawn down thereby with an accelerating force in addition to that of the solenoid itself. When the type bar has nearly completed its stroke the solenoid circuit is automatically broken by the passing of the actuator from the spring contact, the solenoid is consequently disengaged and the type bar permitted to rebound in substantially the same manner is if it were manually operated. It will be obvious that the electric circuits which operate the solenoids to cause the duplication must be rendered inoperative during the setting up operation and the means whereby said circuits are thrown into or out of operation will be pointed out hereafter in connection with the description of the diagrammatic illustrations of the electric circuits exhibited in Figs. 16 and 17. It is sufficient for the present to state that the setting up mechanism comprised in the present embodiment of the invention is entirely mechanical except for the solenoid which serves to rotate the drum intermittently during the setting up operation and that this means for rotating the drum is cut out and a continuously operating motor driving mechanism substituted therefor during the duplicating operation.

The mechanism for positioning the actuators upon the drum which is adapted to be placed into or out of operative relation in respect to the type keys as will be described hereinafter is supported upon a bar 40 having a cylindrical pin 41 extending from one end into a bearing in the top of the standard 12 the end of said bar normally being held against said standard by a helical spring 42 secured to the standard 12 and to the bar in any suitable manner.

The bar 40 is provided with a series of upwardly extending fingers 44 which serve as guides for positioning slides 45 adapted to be actuated by the key levers. The bar 40 is also provided with a lateral flange near its base and parallel apertures are provided in said flange and in the bar 40 between the fingers 44 to receive stop pins 46 and 47 which extend downwardly from the slides 45, the pins 47 being surrounded by helical springs which serve to maintain the slides 45 normally in elevated position.

When the bar 40 is in its normal or setting up position the right end thereof is in contact with the vertical standard 12 as shown in Fig. 4 and slides 45 are positioned directly beneath the key levers of the typewriter mechanism. The depression of a key lever therefore serves to depress its slide thrusting the stop pin 46 through the bar 40 into the path of the actuator 21, so that when the actuator is released from the rack 26 and permitted to travel axially along the surface of the drum it will be arrested beneath the depressed key.

It is of course necessary to release an actuator upon the depression of the stop pin and for this purpose a special mechanism is provided for each half of the typewriter to insure such depression of the rack bar 26 as will positively release the actuator and withhold said rack from reëngagement therewith until said actuator has been arrested by the depressed stop pin.

The means for depressing the left end of the rack bar comprises a lever 50 pivoted at its end 51 to the bar 40 and extending adjacent to said bar beneath projecting flanges 45 upon the base of the slides 45 so that upon each depression of any slide 45 throughout the left half of the typewriting machine the lever 50 will be correspondingly depressed. The lever 50 is provided with an arm 52 which extends over the end of a slidable bolt or pin 53 which is maintained normally in elevated position by a spring 54 and has at its lower end a head 55 positioned immediately above the left end of the rack bar 26.

It will be obvious that upon depression of the key lever and the slide 45 a lever 50 will be depressed forcing down the pin 53 and causing its head 55 to engage and depress the end of the rack bar 26 thus releasing the teeth thereof from engagement with its actuator.

Attached to the lever 50 is an electric contact 56 adapted to engage a resilient contact 57 in a circuit connecting with a solenoid which is adapted to rotate the drum 5 as will be hereinafter described. Upon the depression of the lever 50 the circuit through this solenoid is broken but upon the release of the lever 50 and its return to normal position the circuit will be completed and the drum rotated forward one step so that the different actuators may be positioned successively by the keys in the order in which they are struck.

The length of the drum is so great that it is found to be impractical to depress both ends of the rack 26 from a single lever. The slides 45 at the right end of the drum are therefore caused to engage a lever 60 which is pivoted at its end 61 to the bar 40 and is provided at its other end with an extension 62 which overlaps a corresponding extension 63 upon the adjacent end of the lever 50, these adjacent ends of the levers 50 and 60 being retained in suitable guides 64 and 65 secured to the bar 40 by a clamp 66 or any other suitable means. The depression of any of the slides 45 at the right end of the machine will cause the depression of the lever 60 and by reason of its end 62 overlapping the end 63 of the lever 50 will likewise cause the depression of the lever 50 and thereby operate the mechanism for depressing the left end of the rack bar 26 to release the actuator.

While it is not necessary to depress the right end of the rack bar 26 to prevent the engagement of its teeth with a sliding actuator before it reaches a stop pin corresponding to the depressed key at the left of the middle of the machine it is necessary to depress the right end of the rack 26 so that its teeth will not engage with an actuator and stop it before it reaches a stop pin 46 located upon the right half of the machine; means actuated by the lever 60 therefore are provided for depressing the right end of the rack bar 26. These means comprise a bar 68 (Figs. 5 and 6) which is attached to the end supports 11 and 12 of the machine, and extends parallel to the bar 40; a lever 69 is pivoted at 70 to one end of said bar 68 and is provided with a downward projection 71 at its other end which has a lateral extension projecting over the right end of the rack bar 26. The lever 69 is provided with a pin 72 which extends laterally therefrom beneath the lever 60. Upon the depression of any one of the keys at the right of the center of the machine the stop 45 and its pin 46 will be depressed, the lever 60 will be forced downward thus depressing the lever 50 and through it the left end of the rack bar 26 to release an actuator and at the same time depressing the lever 69 to lower the right end of the rack bar 26 so that the actuator may slide freely along the periphery of the cylinder until it engages the positioning pin 46 of the depressed key.

As has been stated before the depression of any one of the key levers and its corresponding slide 45 causes the breaking of a solenoid circuit which serves to rotate the drum 5 and upon the release of the lever the circuit again becomes completed thus energizing a solenoid to rotate the drum forward one step. It will therefore be obvious that a single actuator is set up upon the drum surface upon the depression of each of the keys so that when the drum is rotated to cause the duplication of the subject matter the key levers will be struck in the same order in which the subject matter was originally set up.

The mechanism for intermittently rotating the drum in the manner above described comprises the solenoid 80, the core 81 of which is attached to the end of a lever 82 which is suitably pivoted upon the base 1 of the machine. The lever 82 is provided with a pivoted pawl 83 adapted to engage the teeth in a disk 84 which is secured to the hollow shaft 16 of the drum head 15. When the solenoid 80 is energized the core 81 is raised lifting the end of the lever 82 causing the end of the pawl 83 to engage a tooth in the toothed disk 84 and advance the drum one step.

In order to provide for a correct positioning of the drum at each step and to prevent overthrow a companion disk 85 provided with teeth extending in the reverse direction from those upon the disk 84 is rigidly secured to the latter. The teeth of the disk 85 are adapted to be engaged by a pawl 86 which is pivoted upon a bracket 87 extending upwardly from the base plate and is guided toward and from the periphery of the disk 85 by a guide, not shown, extending laterally from the lever 82 which carries the pawl 83. An additional pawl 88 may also be pivoted to the top of the standard 12 to engage the teeth of the ratchet wheel 84 to insure the same against backward rotation when the drum is being rotated by electrical power in the duplication of the subject matter originally written for it is to be understood that the drum is actuated by the solenoid 80 only while the actuators are being positioned upon its surface.

When the subject matter has been set up upon the drum in the manner heretofore described the drum is given a positive revolution to duplicate the same by means of an electric motor 90 which is attached to the base 1 of the machine and is provided with a worm 91 adapted to engage the gear 92 mounted upon the countershaft 93 directly beneath a shaft 94 (see Fig. 12) which constitutes an extension of the drum shaft 16. The shaft 93 is provided with a smaller gear 95 which engages a gear 96 which is loosely mounted upon the shaft 94. Suitable clutches are provided as will hereinafter be described for connecting the gear 96 with the shaft 94 and also for connecting the shaft 94 with the hollow shaft 16 of the drum and suitable stop mechanism is also provided whereby the shaft 94 may be released from its engagement with the electrically operated driving mechanism and the drum simultaneously caused to be arrested from further movement.

The clutch mechanism which connects the end of the shaft 16 with the adjacent end of the shaft 94 comprises a ring 97 rigidly secured to said shaft 16 having a pawl 98 normally pressed by a spring 99 into engagement with a collar 100 suitably attached to the end of the shaft 94 and having a shoulder 101 adapted to be engaged by the pawl 98. During the rotation of the drum by the solenoid mechanism above described while the actuators are being positioned the pawl rides freely upon the collar 100. When however the drum is driven by the electrically operated mechanism for duplicating the subject matter set up the shoulder 101 of the collar 100 engages the end of the pawl 98 and thereby imparts rotation to the drum in the same direction in which it was previously rotated by the solenoid mechanism.

The clutch mechanism for connecting the electrically operated driving mechanism to the shaft 94 is arranged in the following manner: The gear 96 is revolubly mounted upon a suitably journaled sleeve 104 which surrounds said shaft 94 and is adapted to be positively connected therewith by means of a half round bar 102 which passes through a cylindrical groove 103 one half of which is in said shaft and the other half in said collar 104 surrounding said shaft.

Figures 2, 12, 13:
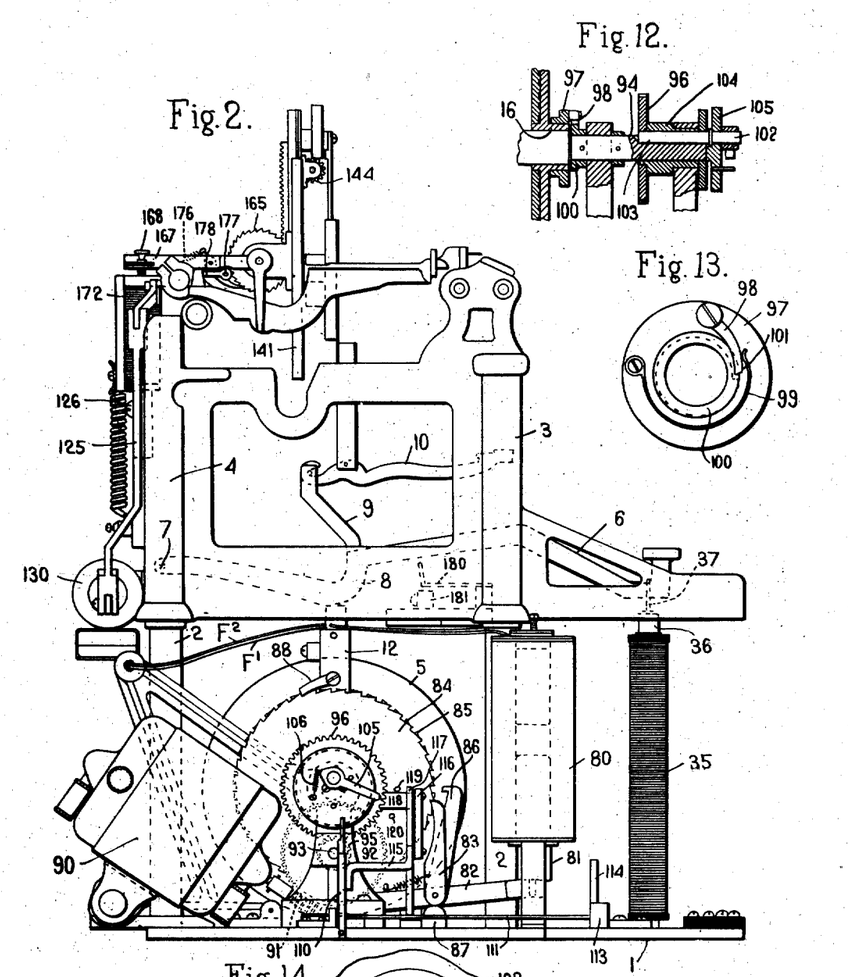
Fig. 2 is a view of the left side of the same.
Fig. 12 is a detail sectional view of the clutch mechanism for operating the drum.
Fig. 13 is a detail side elevation of the clutch face and spring pressed dog engaging therewith.

The end of the bar 102 is attached to a lever 105 which normally is held by a spring 106 in position to positively connect the gear 96 with the shaft 94, the half round bar 102 when in this position being partly engaged by the shaft 94 and partly by the collar 104. (Figs. 12 and 13.)

When the motor therefor is thrown into operation it will positively drive the gear 96 and through it the shaft 94 to rotate the collar 100 and through the pawl 98 rotate the drum as above described.

In order to stop the rotation of the drum means are provided for releasing the half round bar 102 from its position engaging the shaft 94 and the gear 96 and at the same time braking the rotation of the drum. This mechanism comprises a lever 110 attached to a rod 111 journaled in suitable bearings 112, 113 mounted in the base plate 1 said rod having at its end a lever 114 by means of which the lever 110 may be rocked into or out of the path of the lever 105. The lever 110 is provided with an offset arm 115 connected by a link 116 to a vertical latch 117 having a shoulder at its upper end adapted to engage a stop 118 which is pivotally mounted on the toothed disk 84 and retained by a spring normally against a pin 119 but adapted to yield upon engagement of the latch 117 until it comes in contact with a pin 120 at which time the rotating drum 5 is arrested in proper position relative to the setting up mechanism.

Suitable mechanism is provided whereby the actuators may be restored to their normal position which in the device disclosed herein comprises a head 121 (see Fig. 4) having a series of attached parallel rods 122 extending through the drum head 14 and through apertures in the stems 22 of the actuators and provided with laterally projecting ends 123 adapted to limit the extreme movement of the latter. The head 121 is preferably provided with a handle 124 by which it may be moved axially away from the drum head. When it is desired to restore the actuators to normal position at the left end of the drum the handle 124 is grasped by the operator and the head 121 moved axially thus driving out all the rods 122 so that when their ends 123 reach positioned actuators the latter will be moved with the rods until restored to normal position after which the head 121 may be restored to its former position.

Figures 1, 15:
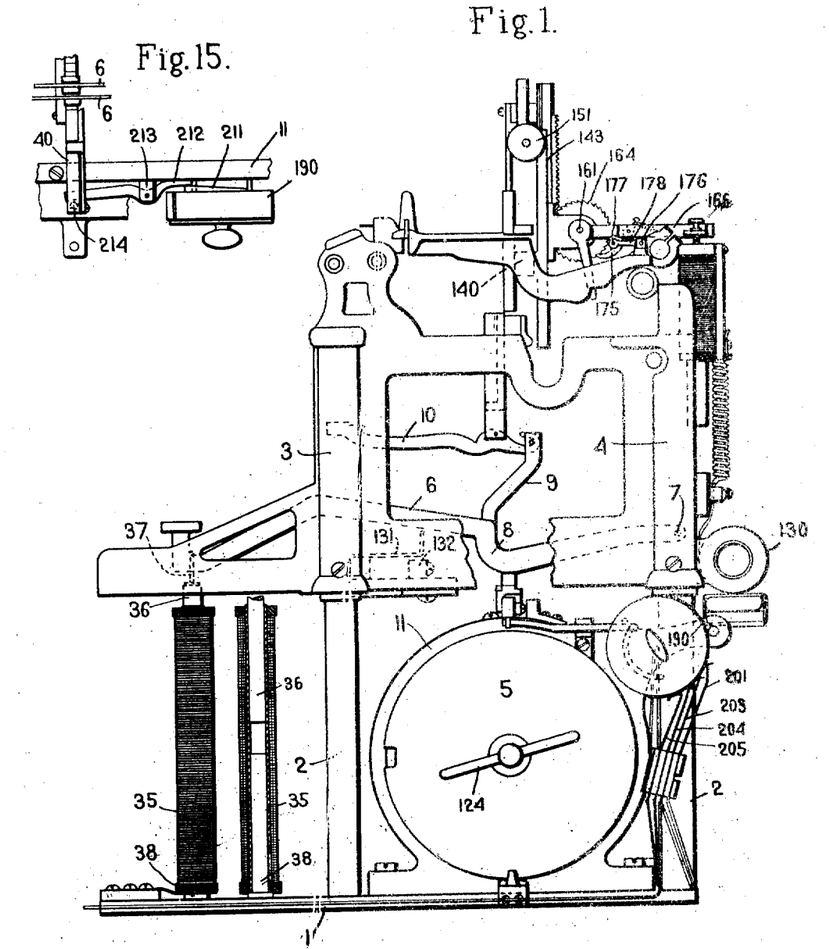
Figure 1 is a view of the right side of a type-writing machine and repeating mechanism embodying my invention.
Fig. 15 is a detail plan view of the means for adjusting the setting up mechanism into or out of operative relation to the levers of the type keys.
Figure 3:
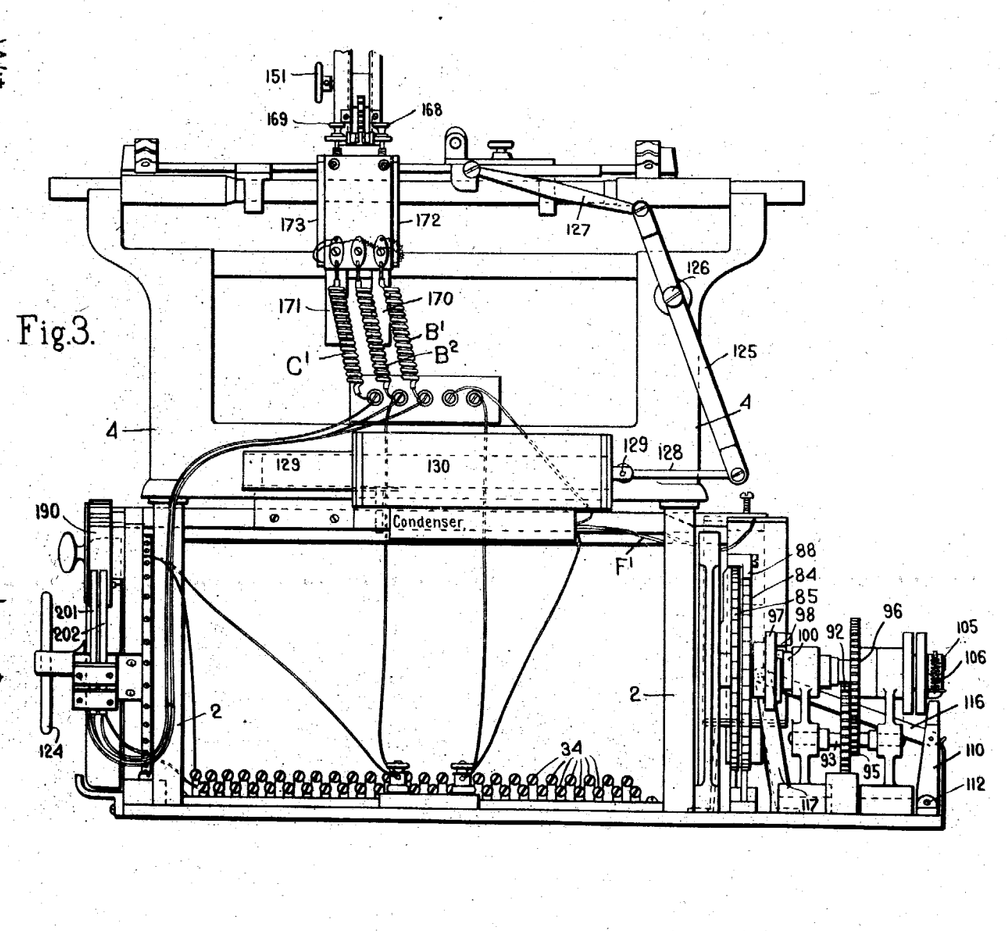
Fig. 3 is a rear elevation thereof.

As has before been pointed out the traverse of the carriage is controlled by the usual typewriter escape mechanism. It is necessary however that automatic means be provided for returning the carriage to its starting position during the duplicating operation. In the preferred embodiment of the invention illustrated herein (see Fig. 3) the means provided comprise a lever 125 pivotally mounted at 126 on the back side of the typewriter frame and connected at its upper end by a link 127 to the usual carriage of the typewriter, the lower end of the lever 125 being connected by a link 128 to the end of the core 129 of a solenoid 130 suitably supported upon the back frame of the machine. The typewriter is provided with a carriage return key adjacent to the left end of the machine and this key is adapted upon depression to close a switch 131, 132 (Fig. 1) to complete a circuit through the solenoid 130. At the same time, the lever depresses a slide 45 and coöperating mechanism of the character above described to set up an actuator which is adapted upon the automatic actuation of the drum during the duplicating operation to depress the return key and cause the return of the carriage at the proper time in the manner above described.

In order to provide for supporting the guide in vertical position in front of the typewriting mechanism the carriage is provided with a cross beam 140 which serves as a platen against which type faces may strike, the card being interposed between the type faces and the platen. A suitable support for the card is attached to the cross beam 140 and is preferably made adjustable relatively thereto and also provided with mechanism by which it may be automatically elevated a half space or a space as the conditions of writing the card may require.

In the apparatus shown herein a vertical guide member 141 is rigidly attached to the beam 140 and is provided with guideways 142 adapted to receive a vertically adjustable rack bar 143. Upon the front side of the rack bar a toothed pinion 144 is preferably mounted in suitable bearings 145 projecting from said rack bar. The teeth of this pinion engage a supplemental rack 146 which is provided at its upper end with an offset portion 147 from which depends a card holder 148 having a groove 149 in the side thereof and which is provided with a grooved extension 150 at right angles thereto to support the lower corner of the card. The shaft of the pinion 144 is preferably provided with a milled hand wheel 151 by which it may be conveniently rotated and is preferably surrounded by a helical spring 152 which serves as a friction device to hold the supplemental rack in desired adjustment.

As before stated the L shaped card holder 148 is mounted immediately in front of the cross beam 140 so that the card will be supported adjacent thereto in position to be properly struck by the type faces. A card is also supported by a card guide 153 carried by a sleeve 154 which is adjustably mounted upon the cross beam 140 and may be provided with a set screw 155 to secure the same in adjusted position according to the width of the cards being written.

Any suitable mechanism may be provided for raising the rack 143 and the attached card holder to space the lines of typewriting upon the card. In the preferred form of the invention illustrated herein however this mechanism comprises a pinion 160 mounted upon a shaft 161 journaled in suitable bearings 162 and 163 secured to the guideway 142. Means are provided for rotating said rack either from the half line key or the full line key of the typewriting machine, such mechanism comprising a pair of toothed disks or ratchets 164 and 165 rigidly attached to the pinion 160 said ratchets being actuated by levers 166 and 167 suitably journaled upon the shaft 161.

The outer end of each lever 166, 167 is adjustably secured, preferably by means of screws 168, 169 to the ends of cores 170, 171 of solenoids 172, 173. Each of the levers 166 and 167 is provided with a pawl 175 which is normally pressed into engagement with the teeth upon the ratchet wheel 164 and 165 by a suitable spring 176. Upon the actuation of either lever 166 or 167 to raise the rack 143 the other lever will prevent the backward or downward movement of the card support. In order to return the rack to starting position it is necessary that both pawls be simultaneously released. To accomplish this result a pin 177 is suitably mounted upon arms 178 beneath the lever 166, and 167 so that the pin 177 extends in front of both of the pawls 175. If therefore, both the levers 166 and 167 are simultaneously raised both pawls will be released from the engagement with the ratchets 164 and 165 permitting the rack bar and the attached card holder to drop into starting position.

This card feeding mechanism is operated from the line and half line keys which are located adjacent to the right end of the machine through electrical contacts 180 and 181 (see Figs. 2 and 16) beneath the line keys which are similar in construction to the contacts above described in reference to the return key it being understood that separate contacts are provided for the half line key and for the line key. The circuits which are controlled by these contacts actuate respectively the solenoids 172 and 173, the one which operates the line key being adapted to be raised a distance twice as great as that which operates the half line key.

The actuation of the line and half line keys also positions actuators upon the drum 5 so that when the drum is being rotated electrically to duplicate the subject matter originally set up the card holder will be raised at the proper time to change the line.

In order to release the card holder and to permit it to return to its starting position after the subject matter of the card has been completed the drum 5 is provided with a pair of twin contacts located upon the last rack bar 26 of the series upon the drum. These twin contacts serve to actuate both the solenoids 172 and 173 simultaneously thereby releasing the dogs 175 in the manner aforesaid and permitting the card holder to drop to starting position.

It will be observed from the foregoing description that in the manual operation of the typewriter and during the setting up of the actuators upon the drum the positioning of the actuators is accomplished through mechanical means, only the rotation of the repeating drum being effected by electrically operated mechanism.

It will also be noted that the carriage return key and the line key and the half line key each controls a separate circuit.

During the setting up operation it is of course necessary that the circuits through the drum and the switches operated thereby shall remain broken and inactive. When however the drum is being automatically rotated by the motor 90 to duplicate the matter set up the last mentioned circuits must be rendered active and the solenoid circuit for rotating the drum broken. The mechanism for accomplishing this result comprises a switch member which is illustrated herein as located upon the standard 11 at the right end of the machine (see Fig. 1).

Figures 16, 17:
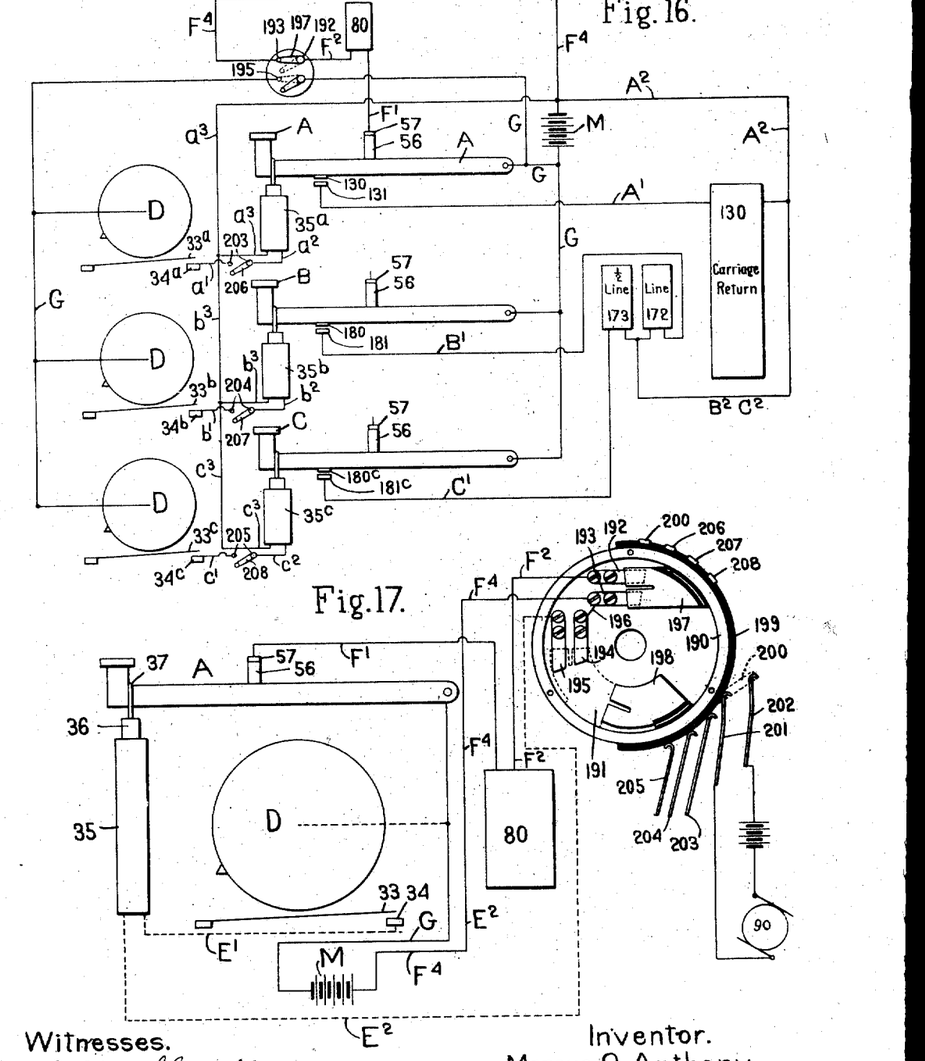
Fig. 16 is a diagrammatic view of electric circuits controlled by the positioned actuators upon the drum to automatically operate said return key and spacing keys.
Fig. 17 shows an end elevation of the switch for controlling the various electric circuits and illustrates diagrammatically the circuits for causing the rotation of the drum and for automatically actuating the type keys during the duplicating operation and their connection with said switch.

This switch which is shown in detail in Fig. 17 comprises two relatively rotatable members, preferably a cylindrical member 190 and a disk 191 of insulating material to which is secured two sets of contacts 192, 193, and 194, 195, the contacts 193 and 194 being connected by a wire 196. Contacts 192, 193 are in the circuit of the solenoid 80 which rotates the repeating drum upon the manual depression of any key lever. The contacts 194 and 195 are in the circuits which include the solenoids for operating the key levers during the automatic action of the repeating drum. The disk 191 is inclosed by the relatively rotatable cylindrical switch member 190 having bridge pieces 197 and 198 attached to its inner surface at substantially diametrically opposite points, but insulated therefrom, the member 197 being adapted to close the circuit of the drum operating solenoid through the contacts 192 and 193 as illustrated in Fig. 17 and the member 198 to close the circuit of the key lever solenoids 35 through the contacts 194 and 195 when the switch member 190 is rotated in the opposite direction to place the bridge 198 in the position illustrated in dotted lines in Fig. 17.

It will be noted therefore that when the circuit including the drum rotating solenoid is closed as indicated in Fig. 17 the circuits controlled by the actuators upon the drum are rendered inoperative and vice versa.

It is necessary to provide means whereby the circuit for the motor 90 which drives the drum shall be rendered inoperative during the setting up of the actuators and this is accomplished by providing the cylindrical switch member 190 with an insulating cover 199 having a bar 200 adapted to bridge terminals 201, 202 in the circuit of the motor 90, these members being so arranged that when the switch 190 is in setting up position the circuit of the motor 90 will be disconnected as is illustrated in Fig. 17 and when the said switch is rotated to duplicating position, in which the bridge piece 198 closes the circuit through the contacts 194 and 195, the bridge piece 200 will lie across the terminals 201 and 202 as illustrated in dotted lines in Fig. 17 completing the circuit through the motor in the manner aforesaid.

It is also necessary that the circuits of the return and the half line and line feeding mechanisms be removed from operative connection with the circuits controlled by the drum during the setting up operation and this is likewise accomplished by providing a series of pairs of terminals 203, 204 and 205 in these respective circuits which normally rest upon the insulated surface 199 of the switch 190 during the setting up operation but which may be bridged respectively by bars 206, 207, 208 when the switch 190 is rotated to the position for causing the automatic duplication above referred to.

In Figs. 16 and 17 various circuits hereinbefore referred to are diagrammatically illustrated. In Fig. 16 A is used to distinguish the key lever for operating the carriage return, B the lever for operating the line key, C the lever for operating the half line key, and F' designates the circuit for actuating the solenoid which rotates the repeating drum it being understood that the contact which is diagrammatically illustrated as projecting from the upper side of key levers A, B, and C corresponds to the contact 56 which is carried by the bar 50 and is actuated by all of the key levers including the carriage return, the half line and full line levers.

In Fig. 16, M represents the source of energy which may be a battery, a dynamo, or other source of electric supply and the key levers A B C and the drum are connected to a common circuit G leading to the battery or are grounded. Tracing therefore the circuit upon depression of key A the current leads from the battery through the ground G and key A through the contacts 130, 131 (see also Fig. 1), the line A' to the carriage return solenoid 130, thence through the line A² to the battery M.

Upon the depression of the key A the contact 56 or 57 is broken, but upon the release of the key and its return to original position this contact is again made and the current coming from the battery M goes through the key A, the contacts 56, 57, the line F' through the drum solenoid 80 thence through the line F² to the contacts 192, bridge piece 197 and the contact 193 (which is diagrammatically illustrated in Fig. 16) thence through the line F⁴ to the battery.

When the switch 190 is thrown into position for duplication the bridge piece 197 is removed from the contacts 192 and 193 and the contacts 194 and 195 are bridged by the member 198, it will thus be observed that the circuit through the drum solenoid is broken but that the circuit through the drum D is so made that when the actuators carried by said drum cross the contact members 33 and 34 the current will be permitted to travel through the solenoids 35. The course of the current in such instance is as follows: leading from the battery M along the conductor G to the drum D, the contacts 33ª, and 34ª which are closed by the actuator on the drum through the line a' to the terminals 203 which are closed by the bridge 206 thence through the line a² to the solenoid 35ª which actuates the return key and finally through line a³ to the battery.

The circuits for the line and half line keys are similar to those of the return key except that the two solenoids which operate the line and half line key have a common return conductor. Upon depression of the line key B the course of the circuit is as follows (Fig. 16). From battery M through key B contacts 180, 181, line B', solenoid 172, return B². For duplication the circuit of the line key is as follows: battery M through line G, or ground, to drum D, through contacts 33ᵇ 34ᵇ line b', switch terminals 204 and bridge 207 line b² to solenoid 35ᵇ, line b³ to battery.

The circuits for the half line key are as follows: upon depression of the key C from battery M, through key C contacts 180ᶜ, 181ᶜ, line C' to solenoid 173 and thence through the common return circuit B², C² to battery.

For duplication the current for the half line key is from battery M through line G or ground to drum D through contacts 33ᶜ, 34ᶜ, line c', switch terminals 205 and bridge 208, line c², to solenoid 35ᶜ and line c³ to battery.

It will be remembered that in the setting up operation the action of the type key levers is purely mechanical. The circuit for operating the type key levers automatically from the drum is indicated in Fig. 17 as follows: the conductor G leads from the battery M to the drum D thence upon depression to the contacts 33 and 34 to the line E' leading to the solenoid 35. From the solenoid the line E² leads to the contact 195 which is at that time bridged by the bridge piece 198 to the contact 194 from which the circuit proceeds through the wire 196 to the contact 193 and thence through the line E² (F⁴) back to the battery.

It will thus be apparent that the solenoids which are attached to the key levers are rendered inoperative during the setting up of the actuators upon the drum but that upon the actuation of the drum for duplicating, the circuits through these solenoids are rendered operative by the depression of the switches which are controlled by the actuators upon the drum surface whereby the keys may be depressed in the order in which they were originally struck to reproduce the subject matter originally written.

In order to provide means whereby the positioning mechanism for the actuators may be disposed out of alinement with the offset portions 8 of the key levers 6 thereby permitting the typewriter to be used notwithstanding the fact that subject matter has been set up in the repeating drum 5 the cylindrical switch member 190 is provided on its rearmost surface with a cam face 211 adapted to engage the end of a lever 212 (Fig. 15) which is pivoted upon a bracket 213 extending from the supporting frame 11 said lever 212 engaging at its other end a pin 214 projecting downwardly from the cross bar 40.

It will thus be apparent that when the switch 190 is rotated in such a manner as to render active the circuits of the solenoids 35 for the duplicating operation the bar 40 will be shifted against the tension of its spring 42 so that the slides 45 and the stop pins 46 will be positioned intermediate of the adjacent keys. When in this position the typewriting machine may be used independently of the repeating mechanism to write subject matter other than that originally set up in the repeating drum. Upon the completion of such writing the automatic rotation of the drum may be resumed to duplicate the subject matter originally set up.

It is to be understood that the embodiment of the invention disclosed herein is illustrative but not restrictive and that the invention may be embodied in other forms of apparatus of various types. For example different forms of traveling mechanism may be provided, different means may be employed for setting up the actuators upon the drum, or the actuators may be arranged to actuate a system of levers to operate the type keys automatically instead of utilizing electrical means of the character herein described. This invention therefore comprehends broadly the combination with typewriting mechanism of repeating apparatus of any kind adapted to reproduce subject matter originally written by the actuation of the keys of the typewriter in the order in which they were originally struck, within the scope of the terms of the following claims.

Having fully described my invention what I claim as new and desire to secure by Letters Patent is:

1. In combination with a typewriting machine having a series of keys and printing mechanism operable by successively striking said keys to write a series of characters, of repeating mechanism including a traveling member having a series of actuators adapted to be positioned by said keys as they are successively struck, means automatically operable by said actuators during continued movement of said traveling member to depress said keys and thereby to cause the same to repeat the characters originally written, means operable by said keys to actuate said traveling member during the initial writing of the series of characters and means for automatically actuating the same during the repeating operation.

2. In combination with an operating machine having a series of keys, and printing mechanism operable by successively striking said keys to write a series of characters, of repeating mechanism including a traveling member having a series of actuators located beneath said keys and adapted to be positioned by said keys as they are successively struck, means operable by said keys for actuating said traveling member, means automatically operable by said actuators during continued movement of said traveling member to depress said keys and thereby cause the same to repeat the characters originally written in the same sequence, means for automatically actuating said traveling member during the repeating operation and means for simultaneously restoring the actuators to inoperative position.

3. In combination with a typewriting machine having keys and printing mechanism operated thereby, of repeating mechanism comprising a traveling member and means for driving the same, actuators carried by said member adapted to be positioned by the operation of said keys, means connected to said keys to be actuated by said actuators to cause the automatic operation of the keys to duplicate the subject matter originally written when positioning said actuators.

4. In combination with a typewriting machine having keys and printing mechanism operated thereby, repeating mechanism comprising a rotating drum and means for driving the same, actuators carried by said drum, means adapted to be operated by the keys in writing characters or words to position said actuators, means connected to said keys to be actuated by said actuators to cause the operation of the keys to duplicate the subject matter originally written.

5. In combination with a typewriting machine having keys and printing mechanism operated thereby, of repeating mechanism comprising a rotating drum, a series of actuators slidably mounted upon the periphery of said drum, springs connected to said actuators, means adapted to hold said actuators normally in inoperative position adjacent to one head of said drum against the tension of said springs, means actuated by the keys to release said actuators, means to position the same, means connected to said keys to be actuated by said actuators to cause the operation of the type bars to duplicate the subject matter originally written, and means to restore said actuators to inoperative position.

6. In combination with a typewriting machine having keys and printing mechanism operated thereby, of repeating mechanism comprising a rotary drum, a series of actuators slidably mounted upon the periphery of said drum, springs connected to the same, a series of toothed bars carried by said drum and normally extended to engage said actuators and retain the same adjacent to one end of said drum, means actuated by the successive operation of the keys in writing to correspondingly release the engagement of said toothed bars with said actuators, means to position said actuators, means for causing engagement of the toothed bars with the positioned actuator and means connected to said keys to be actuated by the positioned actuators to cause the operation of the type bars to duplicate the subject matter originally written.

7. In combination with a typewriting machine having keys and printing mechanism operated thereby, of repeating mechanism comprising a rotary drum, a series of actuators slidably mounted upon the periphery of said drum, springs connected to the same, a series of toothed bars carried by said drum and normally extended to engage said actuators and retain the same adjacent to one end of said drum, means actuated by the operation of the type keys to release the engagement of said toothed bars with said actuators, means to position said actuators, means for causing engagement of the toothed bars with the positioned actuator and electrically operable mechanism connected to said keys to be actuated by the positioned actuators to cause the operation of the type bars to duplicate the subject matter originally written.

8. In combination with a typewriting machine having a set of keys, repeating mechanism comprising a rotary drum, a series of actuators slidably mounted upon the periphery of said drum, springs connected to the same, a series of toothed bars carried by said drum and normally extended to engage said actuators and retain the same adjacent to one end of said drum, means actuated by the operation of the keys to release the engagement of said toothed bars with said actuators, means to position said actuators, means for causing reëngagement of the toothed bars with the positioned actuator and electrically operable mechanism comprising solenoids connected to the type keys, means whereby certain of said solenoids will be caused to be energized by the positioned actuators and thereby operate the type bars to duplicate the subject matter originally written.

9. In combination with a typewriting machine having a series of keys, a series of solenoids, each having its core connected to a key, a revoluble repeating mechanism comprising actuators adapted to be successively positioned upon the operation of the keys, electric contacts in the circuits of said solenoids located in the paths of the positioned actuators whereby the latter will close said solenoid circuits successively and thereby operate the keys to duplicate the subject matter originally written or set up.

10. In combination with typewriting mechanism having a series of keys, a series of solenoids each having its core connected to a key, a revoluble drum located beneath said keys having actuators slidably mounted in the periphery of said drum, mechanism operated by said keys to position said actuators during one revolution of said drum, electric contacts in the circuits of said solenoids located in the paths of the positioned actuator and adapted to be successively closed momentarily during subsequent revolutions of said drum to cause the operation of said keys to duplicate the subject matter originally written or set up.

11. In combination with typewriting mechanism, having keys and printing mechanism operated thereby, of repeating mechanism comprising a rotatable drum having a plurality of actuators movably mounted in the periphery thereof, means operable by the keys of the typewriting mechanism to position said actuators, means adapted to be actuated by said actuators to cause the operation of the type bars to duplicate the subject matter originally written or set up and means to position the actuators positioning mechanism out of operative relation to said typewriting mechanism whereby the latter may be used independently while the repeating mechanism remains set up.

12. In combination with typewriting mechanism having keys and printing mechanism operated thereby, of repeating mechanism comprising a rotatable drum, a series of yieldable racks mounted in the periphery of said drum, actuators slidingly mounted on said racks, and normally held by notches in said racks at one end of said drum against the tensions of suitable springs, means operable by said keys for releasing said actuators, means for positioning the same and for causing their reëngagement with said toothed racks whereby the repeating mechanism will be set up to cause the duplication of the subject matter originally written and means for shifting the means for positioning the actuators out of the path of movement of said key levers, whereby the typewriting mechanism may be used independently of the repeating mechanism.

13. In a typewriting machine having keys and printing mechanism operated thereby, a carriage and means for actuating the same including a line spacing key, a card holder slidably mounted in vertical guides on said carriage, means electrically operated from the line spacing key to advance said card holder the desired space and repeating mechanism including actuators adapted to be positioned by said spacing key to cause the automatic repetition of the operation of the spacing mechanism.

14. In a typewriting machine having keys and printing mechanism operated thereby, a carriage and means for actuating the same including a line spacing key, a card holder slidably mounted in vertical guides on said carriage, a solenoid for actuating said card holder, an electric contact adjacent to said line spacing key and adapted to be operated thereby to energize said solenoid, pawls connected to the core of said solenoid and means actuated by said pawls to advance the holder step by step.

15. In a typewriting machine having a carriage and means for actuating the same, a card holder slidably mounted in substantially vertical guides, a line spacing key, a solenoid, an electric contact adjacent to the spacing key and adapted to be operated thereby to energize said solenoid, means operable by said solenoid to raise the carriage step by step against the action of gravity and means to release the same to permit the carriage to fall to starting position.

16. In a typewriting machine a card holder slidably mounted in guides supported by said carriage substantially normal to the direction of the movement of the carriage, a solenoid for actuating said holder, a line spacing key, an electric contact adjacent to said line spacing key and adapted to be operated thereby to energize said solenoid and means operated by said solenoid to advance said holder a desired space comprising a rack secured to said holder, a gear engaging said rack, an annular ratchet connected to said gear and a pawl connected to the core of said solenoid.

17. In combination with typewriting mechanism including a card holder, means for advancing said holder comprising a pair of ratchet wheels and suitable means connecting said ratchet wheels with said holder whereby the holder may be moved by the rotation of either ratchet wheel, an actuating lever for each ratchet wheel, a pawl carried by each lever engaging its ratchet wheel, independent means for actuating said levers whereby the pawl carried by one lever will cause the rotation of said ratchets to advance the holder and the pawl carried by the other lever will prevent backward rotation of the ratchet when the first mentioned pawl is restored to normal position.

18. In combination with typewriting mechanism including a card holder, means for advancing said holder comprising a pair of ratchet wheels and suitable means connecting said ratchet wheels with said holder whereby the holder may be moved by the rotation of either ratchet wheel, an actuating lever for each ratchet wheel, a pawl carried by each lever engaging its ratchet wheel, independent means for actuating said levers whereby the pawl carried by one lever will cause the rotation of said ratchets to advance the holder and the pawl carried by the other lever will prevent backward rotation of the ratchet when the first mentioned pawl is restored to normal position, means for simultaneously actuating both levers and means whereby such operation will cause the disengagement of both pawls with their respective ratchets to permit the restoration of the card holder to normal position.

19. In combination with typewriting mechanism having a series of keys including typewriting keys, a full space key and a half space key, a card holder mounted in guides substantially normal to the direction of movement of the carriage, means for advancing said holder comprising a rack secured to said card holder, a gear engaging said rack, a pair of ratchets rigidly connected with said gear, a lever having a pawl engaging one ratchet, means controlled by the half space key adapted to actuate said lever to advance the card holder a half space, a lever having a pawl engaging the other ratchet, means controlled by the full space key adapted to move the last mentioned lever a greater distance than that of movement of the first mentioned lever to advance the card a full space.

20. In combination with typewriting mechanism having a series of keys including typewriting keys, a full space key and a half space key, a card holder mounted in guides substantially normal to the direction of movement of the carriage, means for advancing said holder comprising a rack secured to said card holder, a gear engaging said rack, a pair of ratchets rigidly connected with said gear, a lever, having a pawl engaging one ratchet, means controlled by the half space key adapted to actuate said lever to advance the card holder a half space, a lever having a pawl engaging the other ratchet, means controlled by the full space key adapted to move the last mentioned lever a greater distance than that of movement of the first mentioned lever to advance the card a full space, repeating mechanism comprising actuators adapted to be positioned by the operation of said space keys to cause the automatic operation of the spacing mechanism during the duplicating operation and means, operable at the end of each cycle of the repeating mechanism adapted to restore the card holder to initial position.

21. In combination with duplicating typewriting mechanism having a spring actuated carriage, carriage returning mechanism comprising a solenoid having its core suitably connected to said carriage, a return key adapted to close the current of said solenoid to cause the carriage to be restored to initial position and means adapted to be positioned by said return key to cause the automatic restoration of the carriage at the termination of each line of duplication.

22. In combination with typewriting mechanism having type keys, a printing mechanism operated thereby, a carriage return key, and a line spacing key, of repeating mechanism comprising actuators positioned by said keys as the subject matter is being originally written or set up, means operated by said actuators to cause the operation of the keys aforesaid to duplicate the matter originally written or set up.

23. In combination with typewriting mechanism having keys, and repeating mechanism comprising actuators adapted to be positioned thereby, of means operable by the depression of any of said keys to advance said repeating mechanism one step, means for rendering said advancing mechanism inoperative and means for automatically actuating said repeating means continuously to cause the repetition of the subject matter originally written or set up.

24. In combination with typewriting mechanism having keys and repeating mechanism comprising actuators adapted to be positioned thereby, of means operable by the depression of any of said keys to advance said repeating mechanism one step comprising a solenoid and mechanism operated thereby and a contact in the electric circuit of the solenoid adapted to be made upon the restoration of the key to normal position.

25. In combination with typewriting mechanism having keys and repeating mechanism comprising actuators adapted to be positioned thereby, means for operating the repeating mechanism including a ratchet carried by said repeating mechanism, of a solenoid having a circuit adapted to be broken upon the depression of any key and to be made upon the restoration of the key to original position, a lever actuated by said solenoid, and pawl mechanism adapted to engage suitable ratchets carried by the repeating mechanism.

26. In combination with a typewriting mechanism having keys and repeating mechanism comprising actuators adapted to be positioned thereby, of means for rotating the repeating mechanism step by step during the setting up of the actuators, means for releasing said step by step actuating means, means for continuously driving said repeating mechanism to cause the repetition of said subject matter set up, and stop mechanism for said repeating mechanism comprising a clutch and means for disengaging said clutch from the driving mechanism and for simultaneously braking the rotation of the repeating mechanism.

27. In combination with a typewriting mechanism having keys and repeating mechanism comprising actuators adapted to be positioned thereby, of means for rotating the repeating mechanism step by step during the setting up of the actuators, means for releasing said step by step actuating means, means for continuously driving said repeating mechanism to cause the repetition of said subject matter set up, and manually operable stop mechanism for said repeating drum comprising a clutch and means for disengaging said clutch from the driving mechanism and for simultaneously braking the rotation of the repeating mechanism, and a cushioned stop to finally arrest the repeating mechanism.

In testimony whereof, I have signed my name to this specification, in the presence of two subscribing witnesses.

MARCUS O. ANTHONY.

Witnesses:
G. ALBIN WALLIN,
A. MACCOUN.